United States Patent
Hunkins et al.

[11] Patent Number: 6,141,663
[45] Date of Patent: Oct. 31, 2000

[54] AUTOMATIC EXTERNAL DATA SYNCHRONIZATION METHOD

[75] Inventors: Andrew D. Hunkins, Plymouth; Brian R. Stromquist, Minneapolis, both of Minn.

[73] Assignee: Unimax Systems Corporation, Minneapolis, Minn.

[21] Appl. No.: 08/210,320

[22] Filed: Mar. 18, 1994

[51] Int. Cl.[7] .................................................. G06F 12/00
[52] U.S. Cl. .......................................... 707/201; 395/600
[58] Field of Search ............................. 395/600; 707/201

[56] References Cited

U.S. PATENT DOCUMENTS

| | | | |
|---|---|---|---|
| 4,714,995 | 12/1987 | Materna et al. ........................ | 707/201 |
| 5,278,978 | 1/1994 | Demers et al. ......................... | 395/600 |
| 5,345,586 | 9/1994 | Hamala et al. ......................... | 395/650 |
| 5,353,401 | 10/1994 | Iizawa et al. ........................... | 395/161 |
| 5,369,778 | 11/1994 | San Soucie et al. ................... | 395/800 |
| 5,403,639 | 4/1995 | Belsan et al. ........................... | 395/600 |
| 5,410,675 | 4/1995 | Shreve et al. ........................... | 395/500 |
| 5,416,917 | 5/1995 | Adair et al. ............................. | 395/500 |
| 5,978,811 | 11/1999 | Smiley .................................... | 707/103 |

*Primary Examiner*—Wayne Amsbury
*Attorney, Agent, or Firm*—Schwegman, Lundberg, Woessner & Kluth, P.A.

[57] ABSTRACT

Data integrity between multiple databases with redundant data fields is enhanced by a synchronization method which adapts to unspecified database formats by a flexible format definition, identification of a data origin and identification of data targets to significantly improve data integrity and update efficiency in legacy database systems.

6 Claims, 6 Drawing Sheets

MANUAL UPDATE
WITH NO
SYCHRONIZATION

MANUAL UPDATE METHOD

AUTOMATIC DATABASE UPDATE

AUTOMATIC EXTERNAL DATA SYNCHRONIZATION METHOD

FIELD OF THE INVENTION

The present invention relates to data processing methods and more specifically to methods for updating redundant data in disparate databases. The invention is particularly applicable in the field of management of telecommunications systems, where redundant data is very common.

BACKGROUND OF THE INVENTION

The daily operation of business, governmental and other types of organizations has become increasingly dependent upon the use of computerized systems to keep track of necessary data. A large organization typically has a number of systems with databases of information for different purposes. Typically these databases contain redundant data. A familiar example is the multiple forms a new employee is typically asked to fill out, for things such as payroll, tax, insurance, phone listing, and perhaps things such as parking permits. Although each form is for a different purpose, the person is asked for some of the same data such as name, address and Social Security number for each form. Each form eventually is input into a computer system, thus leading to the creation and maintenance of multiple databases which have some common, redundant information. Conceptually, all the organization's database needs could be covered by a single, comprehensive system wherein each purpose or application would be as a defined subset of the whole. However, such is not the case in practice, and for a number of reasons any given organization probably has a large and growing number of databases as new systems are being added and new functions are being automated. When the common data changes, this necessitates changing data in each of the data systems, a process which involves considerable effort, cost, and the possibility of introducing mistakes.

The field of telecommunications management presents a number of situations where common pieces of information are needed in a number of disparate systems. The most common example is an employee's name. A change in an employee's name happens frequently in large corporations. It includes everything from the exact spelling e.g. "John" vs. "Jon" or the inclusion of a middle initial or Jr. designation to people who have just been married and taken the name of their spouse.

When an employee wishes to change the exact appearance of their name, as many as seven or more databases must be updated with the changed information.

Here are some examples:

a. Telephone Switch or PBX: This system uses an individual's name to display it on a telephone to let called parties know who is calling them.

b. Voice Mail: These systems include the name of an individual attached to voice mailboxes in the form of a directory. A caller from outside the company can key in, by touch tones (DTMF), the letters for an individual's last name. At the point where the sequence becomes unique, the voice mail system will prompt the caller to record a message in the recipient's voice mailbox.

c. Directory Service: When a caller calls into the company's main reception desk, they will ask for an employee by name. Since the telephone system needs an extension number to extend the call, a cross-reference must be available. Directory Service applications must have a list of employee names and an up to date extension number to transfer the call.

d. Call Accounting: When employees make long distance phone calls, their calls are tracked by a call accounting system. This system will produce reports on both usage and abuse. The system needs the name of the individual that corresponds to each extension number to make the reports more clear. Without this information, abuse reports and telephone bills must be constantly cross-referenced.

e. Cable Management: As corporations manage their cable plant, it is more efficient to show the individual's name at the termination point of each cable.

f. Inventory Control: These systems track property of the corporation. It is helpful to show, by name, who in the company is using a particular piece of equipment.

g. Work Order Entry: When entering work orders for service, it is helpful to show the individual's name associated with each trouble ticket. Corresponding work orders should also show the name of the individual for whom the work is being done for.

DESCRIPTION OF PRIOR ART

A typical situation in the prior art in field of telecommunications management is illustrated in FIGS. 1 and 2. In FIG. 1, an organization is depicted as having four external programs or processes, which contain some common or redundant data, but which have their own databases and which are essentially "islands of automation" for their specific tasks. The external systems shown are: PBX 11, Directory 12, Call Accounting 13, and Voice Mail 14.

When a change is necessary, for example, if a name is to be changed from "John" to "Jon", a change order 20 is typically generated and sent to administration, as indicated by reference numbers 21, 22, 23, and 24 in FIG. 1. This in turn causes changes to be made in each of the four databases shown. In other cases, there could easily be more than four.

FIG. 2 shows the situation of FIG. 1 in greater detail, wherein each of the "island of automation" databases has been exploded out to show that the employee names are contained in each separate data file as indicated by reference numbers 11c, 12a, 13a, and 14a. In the prior art, each of these must be changed, which is time-consuming and can lead to errors.

In the prior art there are three general ways of updating redundant data in separate databases.

Manual Update. Each of the databases containing redundant data can be viewed as islands of automation. Information that is common to all can be updated by manually entering the information into each of the separate databases. This is an extremely common method. The greatest disadvantage is that the amount of work necessary for one change is multiplied for each database containing the redundant data to be updated. Consequently, a large human error factor is introduced and it is difficult if not impossible to have all of the redundant data perfectly synchronized.

Import/Export of ASCII Files. Nearly all software programs have a feature using where data contained in its database can be copied from the program's internal format into a standard format outside of the control of the program. The example most often used is an ASCII text file. Such programs also usually provide a feature where an ASCII text file having the appropriate data (such as a file previously exported by the program) can be imported. One technique would be to manually update the files while in their ASCII-exported form. However, manual updates are subject to the disadvantages noted above. In addition, the export function must usually be done manually, as does the subsequent re-importation function, which is necessary in order to be used by the program. Also, any further updates to the program's data which may have occurred in the meantime are not reflected in the exported text file.

Standardized Data Exchange Facilities. Software programs sometimes use facilities made available by the operating system or some agreed upon manner. This requires that the program be coded to the standard and that the receiving program or process also be coded to the standard. Any program that existed before the standard or which is incompatible with the other's standard does not have this method available to update data. Examples of these methods are Microsoft Corporation's DDE, OLE and OLE2; and Apple Computer's Publish and Subscribe; as well as an operating system's "clipboard" or "copy/paste buffer".

Problems in Prior Art Update Methods. Of the over 100,000 sites where telecommunications management occurs, the manual update method is the most commn. The other options either require the purchase of new systems along with complex analysis for compatibility or constant batch processes to synchronize data at intervals while data immediately becomes out of sync until the next batch process.

Consider the enormous waste of time and money spent managing these systems. The examples given here are only several of many commonly used applications. In addition, each business will have a set of applications specific to the needs of that business. If a single change is magnified 5, 10 or 15 times in time, effort and money, the potential for an improvement is staggering. The update method of the present invention, as explained in detail below, will significantly reduce the time and costs of updating, and will have significant impact on expense reduction of individual businesses to the degree of noticeable profit increases.

However, the problems with prior art update methods not only involve cost and efficiency, but in some cases safety can also be an issue. Consider the integration of those systems involving Emergency 9-1-1 service. When an individual moves from one location in a campus environment to another, the E9-1-1 system must be updated. Again, this is another database which needs to be updated and is another opportunity to forget or to enter the data containing a human error. Such a mistake can easily lead to delay and serious consequences in responding to an emergency. Unfortunately, it is not known if there is an error in the data until it is too late. The brute force method of manually inspecting each individual database record at any reasonable interval is a practical impossibility for large systems. Therefore the records are not checked and the potential for disaster is real. Experts in the E9-1-1 industry estimate that the data held in such databases at any one time contains 5% inaccurate data. This is clearly an area where computers can be applied, but until now, there was no method for synchronizing the entry of such information.

This inefficiency over the large number of sites constitutes a phenomenal cost both in sheer labor to overcome the problem and in the errors that cause costly mistakes. The introduction of the present invention will offer significant savings and represents a considerable value.

On the present course of developments in the industry, the problems are getting worse, not better, as more vendors release telecom management packages, each with its own software database format and characteristics. Without the use of the present invention, each additional vendor's package will be viewed as just another island of automation—another database to synchronize, adding to the problem.

SUMMARY OF THE INVENTION

The present invention solves these and other problems in the data management and telecommunications industries by providing a new method for synchronizing redundant data in multiple, disparate databases, with less expenditure of time and effort, while providing greater accuracy, as compared to prior art methods.

It is an object of the present invention to allow redundant data to be updated automatically, without human intervention, in order to provide and preserve data integrity and synchronization.

It is another object of the present invention to allow data that is used by or is in the control of another program or process to be updated as a viable method for existing programs and legacy data requiring no retrofitting to or upgrading of existing programs or processes.

It is yet another object of the present invention to maintain or continually update data that is used by or is in the control of another program or process.

Accordingly, an automatic external data synchronization method according to the present invention includes the steps of: initializing the set of data to be maintained; determining the different format requirements for the different databases to be maintained; identifying the data location or general data identity; linking data components where redundant; and repeating the above steps for each database of redundant data.

BRIEF DESCRIPTION OF THE DRAWINGS

The foregoing and other objects, features and advantages of the invention, as well as the presently preferred embodiments thereof, will be apparent from the description of the preferred embodiments of the invention, and the accompanying drawings in which.

DESCRIPTION OF THE PREFERRED EMBODIMENTS OF THE INVENTION

The preferred embodiment for each of the steps of the present invention follows. Additional enhancements will also be described which are natural extensions to the present invention. Those skilled in the art will find other extensions and applications within the scope and teaching of the present invention.

Figure 1:
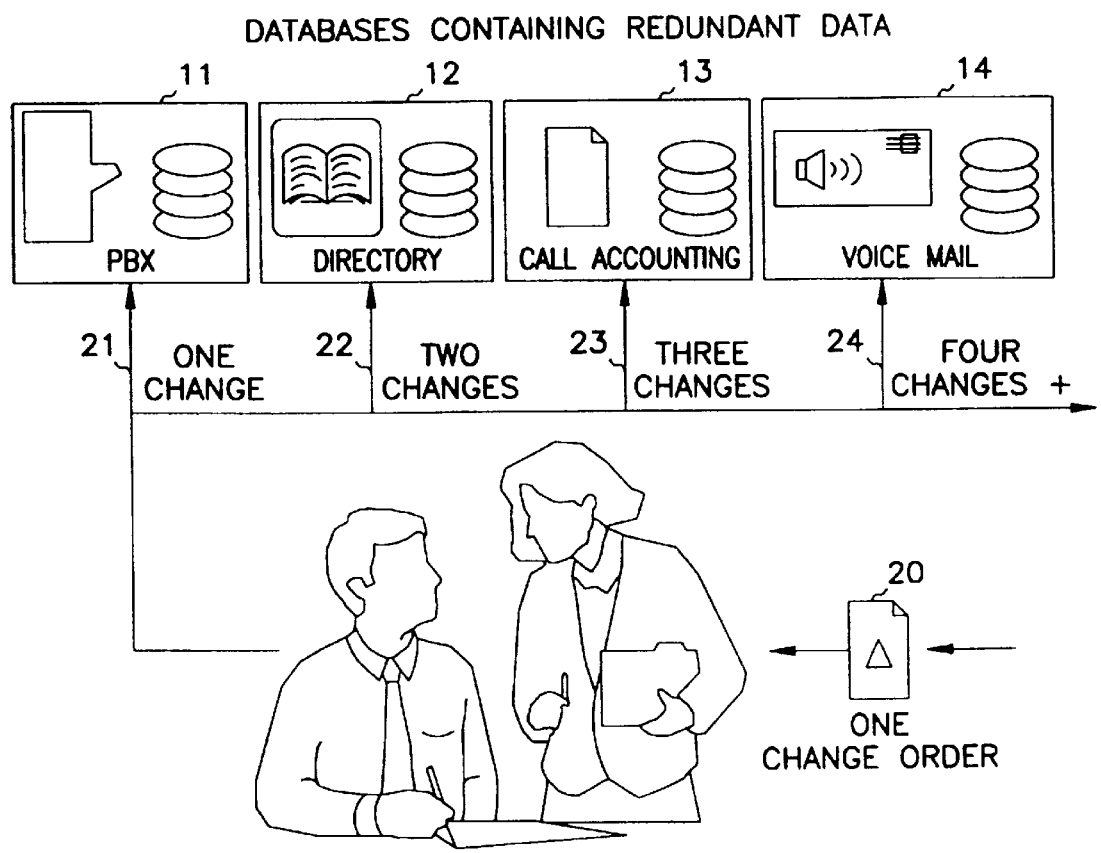
FIG. 1 is an illustration of the prior art method of manually processing a change order in a typical telecommunication management environment.
Figure 2:
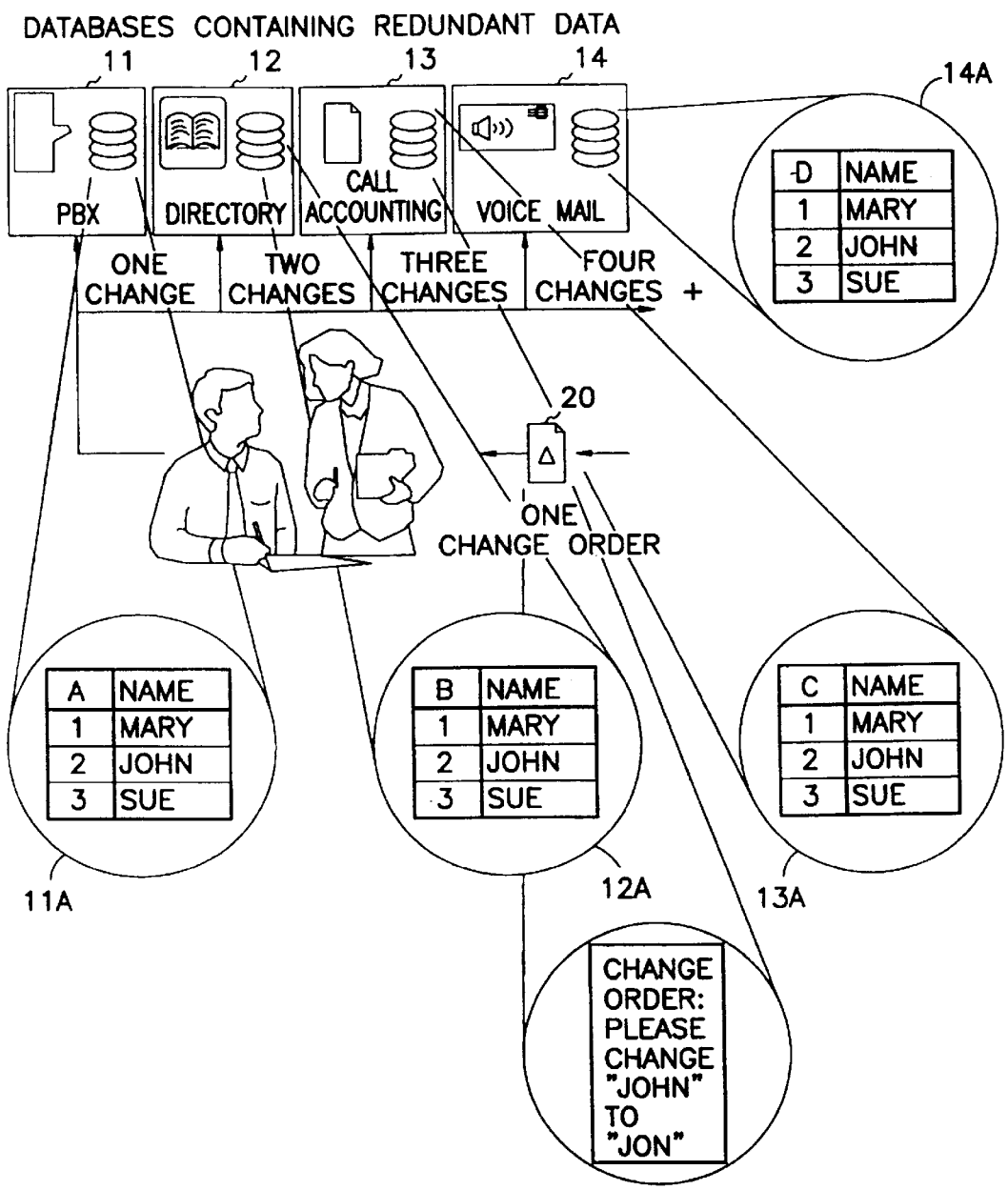
FIG. 2 is a view similar to FIG. 1 with additional detail showing how redundant data is sprinkled among islands of automation and a typical request to change the redundant information.
Figure 3:
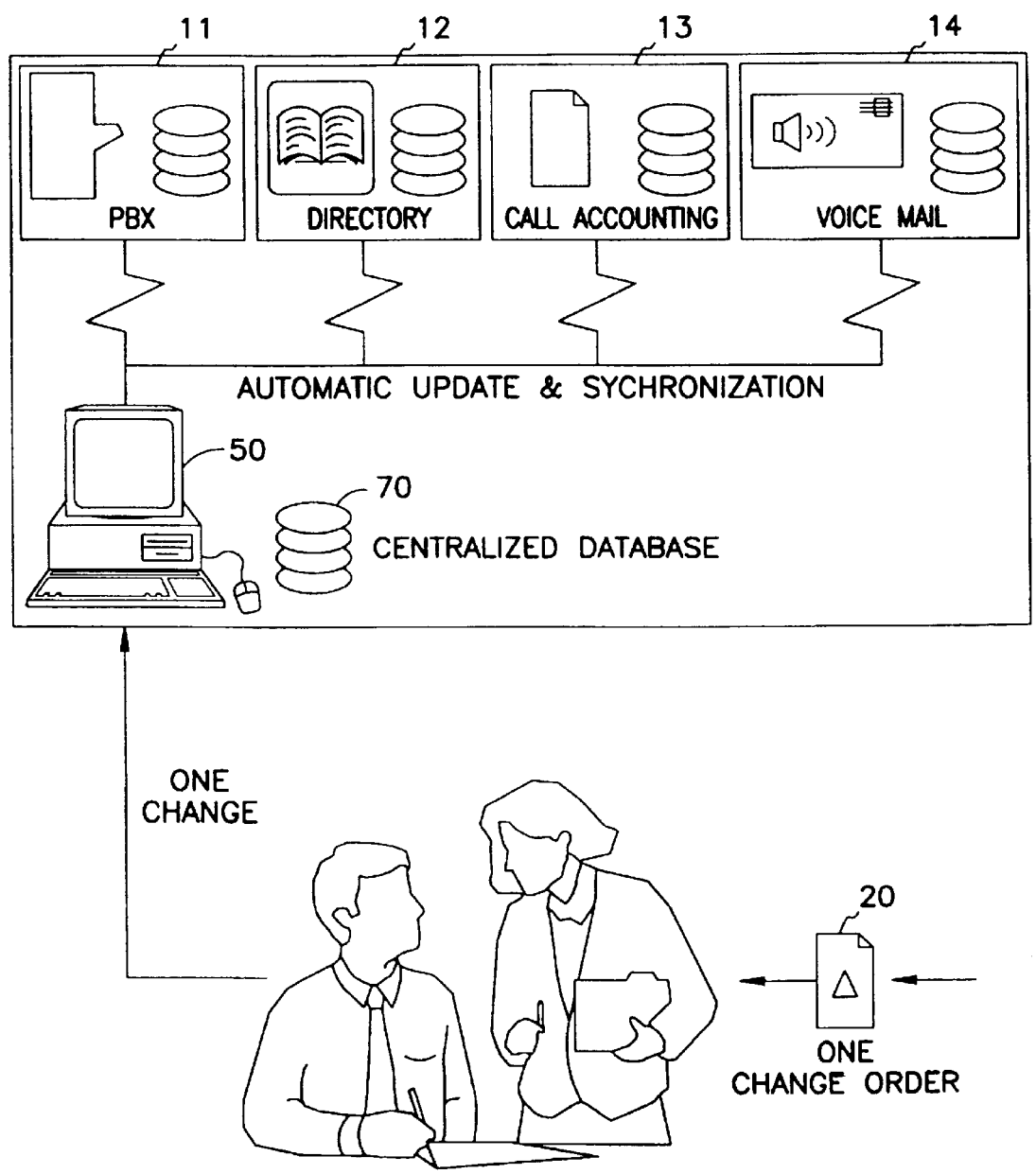
FIG. 3 is an illustration of the present invention being used to automatically update the redundant data, with the work load reduced to a 1:1 ratio and data is accurately updated and synchronized without action from the existing programs, processes or systems.
Figure 4:
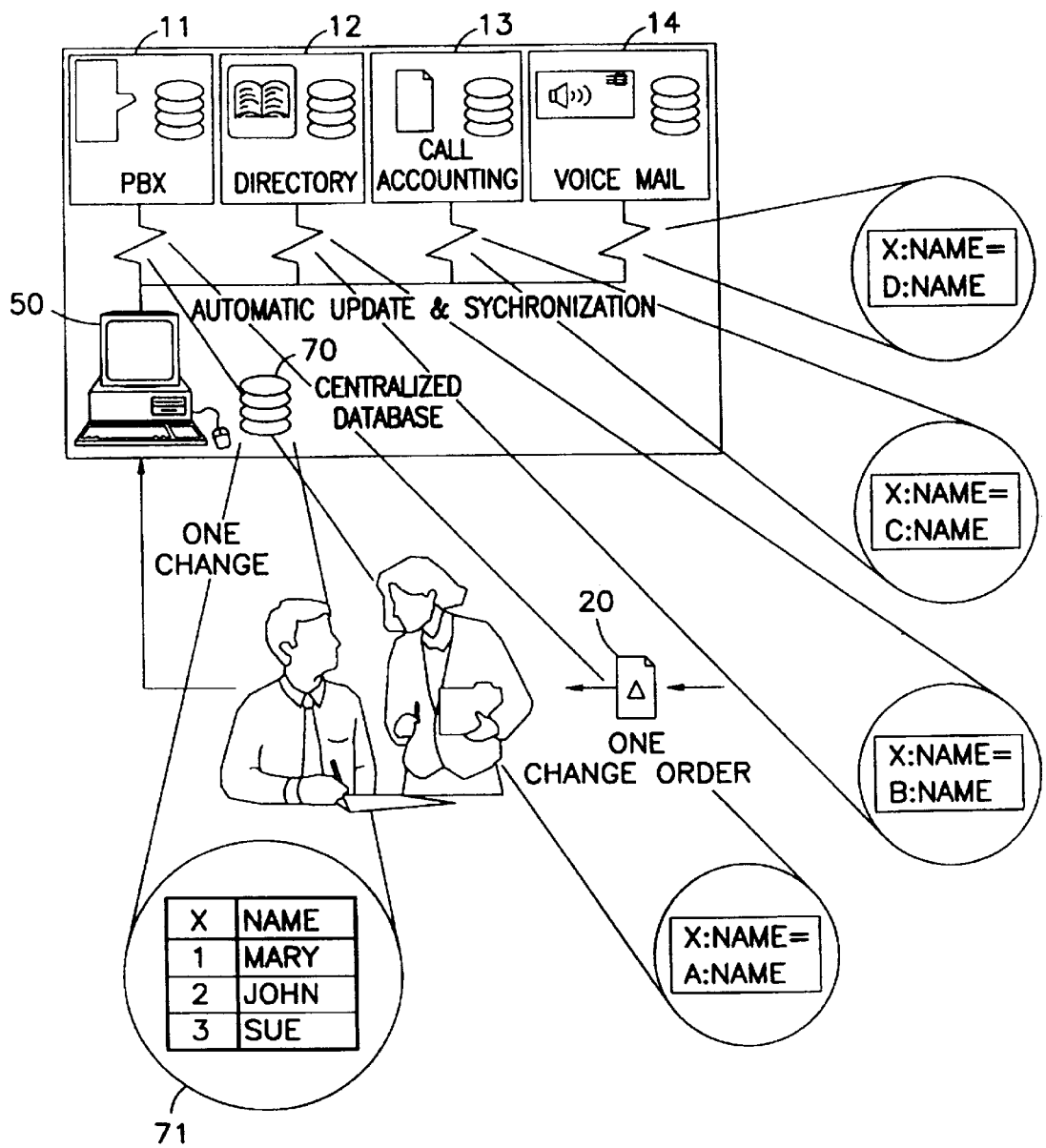
FIG. 4 is a view similar to FIG. 3 with additional detail showing how a master copy of the redundant data is maintained and showing the references to where the redundant data exists.

An overview of the operation of the invention is illustrated in FIGS. 3 and 4, which contrast with the prior art in FIGS. 1 and 2, respectively. In FIG. 3, a situation similar to that of FIG. 1 has occurred. However, in this case, a single change order 20 to administration, to change the employee name, only requires one update to a computer 50 having the centralized or common database 70 of the present invention. This computer then performs automatic update and synchronization of all four (or more, if others are present) external databases 11–14. This is shown in greater detail in FIG. 4, wherein the name fields of the various data files are exploded out to show the common data base contains all the names as indicated at 71, and information, as described below, to link this information to the corresponding name fields in the external data files, in a way that the computer can change and update them all.

1. Steps of the Present Invention

1a. Initialize the database

Any database that contains redundant data must be brought to a state to where the redundant data will be synchronized from that point forward. In nearly all practical applications nothing needs to be done. However, if processes have been initiated that contain references to the unsynchronized data, these processes would be finalized thereby removing any reference to stale data. In these situations, the external program or process which controls the external database should be "cleared" of any references to or copies of the redundant data.

As an example, a call accounting package usually runs reports periodically throughout the month and creates a final billing cycle at the end of the month which closes the month and prepares for next month. It would be best to begin using the present invention just after the month end close. Using it in mid-month could result in old data suddenly being correct in reports representing the same time period. This would cause needless confusion.

1b. Alternative Initialization

It is often the case that external programs or processes can accept or work with an external file as a standard ASCII text file. In this case it is helpful to generate the initial data file to be used. This is simply handled by exporting an ASCII text file to initialize the external data file. The present invention will maintain the file from that point forward.

The example here is to export the specific fields from the central database that will be used by the external process. In the case of an E9-1-1 system, the important data is each station's extension number, and ANI. This information would be sent to the E9-1-1 processor so that the correct ANI number is transmitted whenever a given station dials 9-1-1. The ANI number and the ALI information must also be sent to the local telephone company in order to know the location of the station.

These files can be generated on a one-time basis from the central database. From that point forward, the present invention can be used to keep the data updated, accurate and synchronized.

1c. Determine the Format

The preferred embodiment of the present invention uses a Format file to describe the format of each external file to be maintained. As used herein, a Format file is a file which describes the important or essential characteristics of the external data file, or its exported ASCII version if it is capable of reimporting and using it, to allow the identification and surgical replacement of individual data, including information on such characteristics as field names, field sizes, padding, field and record delimiters, and the like.

Here is an example of a Format file used in the present invention:

[General]
      Name=Rolm 9000 System Enhanced Fields
      Version=1.0.0
   [Format1]
      Name=DID Blocks
      Mode=Delimited
      RecordDelim=/013/010
      FieldDelim=/009
      HasHeader=No
      Sorted=No
      KeyField=1
      Field1=N"DIDStart" IDIDS TSTRG FRWA
      Field2=NI"DIDEnd" IDIDN TSTRG FRWA This method has the advantage of an extensible mode of parsing the external file. The mode options can be expanded to include all types of media. Future formats including virtual network data objects, as an example, in lieu of data files would be easily accommodated.

The specific example here depicts a file that contains database records where each record is separated by a carriage return. Each individual field is also delimited by a tab character. The two fields in this example are of type string.

One of the fields is identified as the Key Field, which must be unique, and must be mentioned in the Format file. Preferably this should be something common to all the external data files, such as "name", and not something such as, for example, "hair color" which would not probably be found in all external data files. The Key Field is used later on in processing changes.

The format of the file, whatever it is, used by the external process or program must be determined and presented to the current invention in a machine readable form such as the one shown.

The other notable component of this implementation is the identification of individual datum as being readable or writable. The described specification demands that there be only one readable source, that is, one version of a redundant datum be considered the master. This enables this scheme to propagate changes in the master to the other writable versions who need to be synchronized to any change in the master datum. This is a preferred embodiment preference and not a restriction imposed by the present invention.

1d. Identify the Location

Location here is a simplified term of the general file profile, meaning the necessary information to make the data unique compared to other data that may be identical in structure. Location is the primary difference in most cases but uniquely identifying the data is not limited to location only.

As an example, the most common practice is to have the common database exist on a network file server. All external processes or programs are given file visibility to the file server. The external processes or program's data are maintained on the file server as well. The locations of the files involved are then uniquely identified using the file naming convention determined by the operating system. In the example of MS-DOS the file name and path might be something like:

g:\appdir\modldir\file.dat

1e. Link the Data

The preferred embodiment uses a link file to maintain references to various files. As used herein, a Link file is a file which lists all Format files, (there can be a variable number), and for each Format file, lists which external data files that apply, and their address. Note that there can be more than one format per Format file, so in general it is not a one-to-one relationship. In this manner each data file is linked to a Format file.

Here is an example of a Link file:

```
[SEF]
FormatFile  =  R9000SEF.FMT
DataFile1   =  COS_NAME.TXT
DataFile2   =  FPLTNAME.TXT
DataFile3   =  COMMNAME.TXT
DataFile4   =  DISTNAME.TXT
DataFile5   =  HUNTNAME.TXT
DataFile6   =  PICKNAME.TXT
DataFile7   =  SYSPNAME.TXT
[UDF]
FormatFile  =  UDF.FMT
DataFile1   =  RXTN_UDF.TXT
DataFile2   =  PADS_UDF.TXT
DataFile3   =  PADS_UDF.TXT
```

The preferred embodiment can handle multiple sets of redundant data links. Two are shown above. One shows System Enhanced Fields that contain information added to that which is read from a PBX. The other is a link to files containing User Defined Fields which are maintained for a call accounting system.

Figure 5:
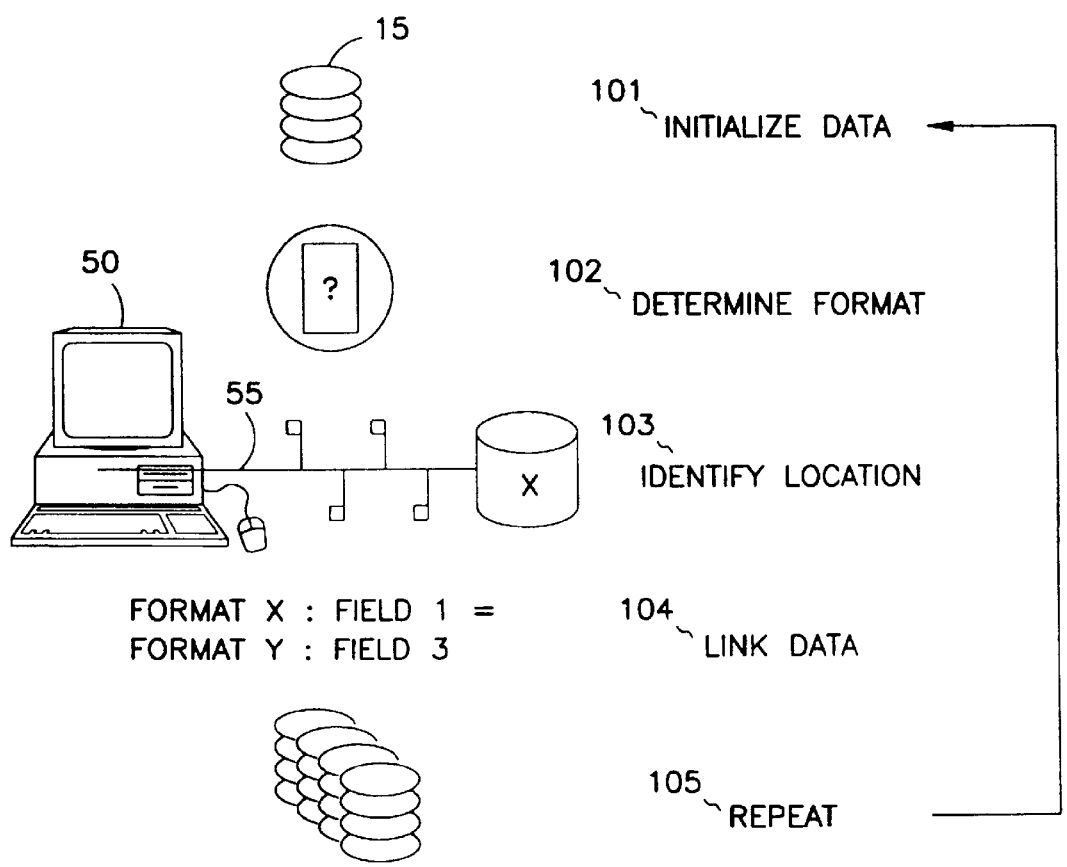
FIG. 5 shows the steps of the present invention in analyzing the databases to be synchronized.

The process of setting up the invention described above is symbolically shown in FIG. 5, wherein the computer 50 connects over a network or other connection device to a number of external databases such as the one indicated by the letter x. The database such as 15 is first initialized as indicated by step 101. The format is then determined as indicated at step 102 and its location for axis is also identified at step 103. The data is then linked to step 104, as described above, and at step 105, the process is repeated for each of the external databases.

2. Process of the Present Invention

Following is an overview description of the preferred embodiment of the process involved when a change or update is made to the common database.

Figure 6:
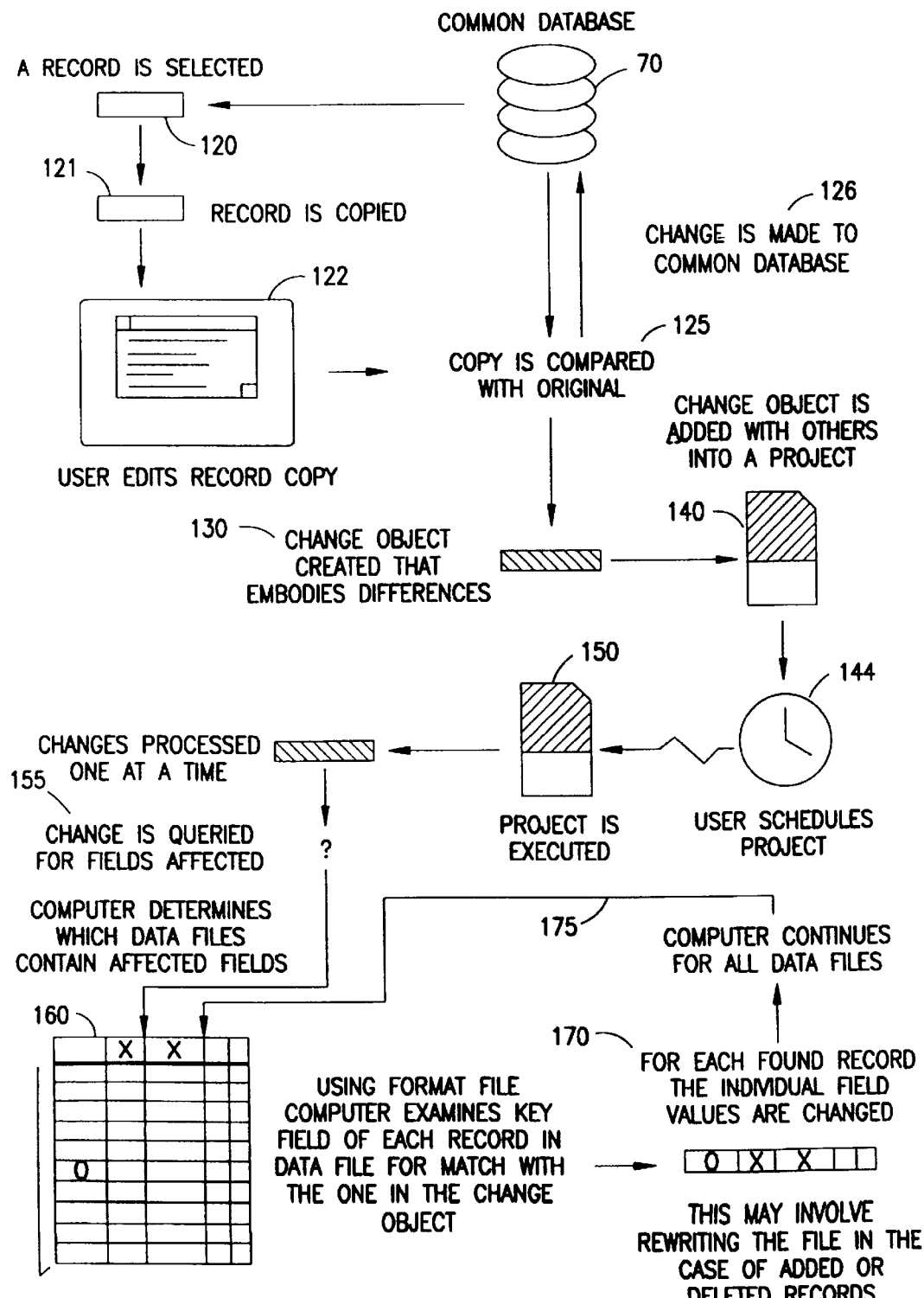
FIG. 6 shows the steps of the present invention in creating a Change Object for and update, and applying it to all affected databases by rewriting the affected updated records in the databases

When a change is made to the common database, the information in a record of the common database is placed on the screen for the user, as indicated in FIG. 6. The user modifies one or more fields in the record and then saves or commits those changes to the database. The preferred embodiment generates a Change Object which also happens to be a record. The Change Object should have a Key Field as well as any other field needing change. The Change Object is generated by comparing the state of the old record edited by the user and the state of it after the editing. The Change Object contains all of the information in it that is necessary to change the old record to be the new record. If no errors are discovered during the Change Object generation, the Change Object is instructed to "do it". This message tells the Change Object to go into the common database, find the old record and make the changes as the user described. This happens and the common database is now representative of the new data.

The Change Object is now placed in a batch file which is referred to as a Project. The user continues to edit records in this way generating c Change Objects which are added to the user's Project.

The user then completes the final change that makes up the logical set of changes that represent the user's Project. The user now has an opportunity to review the changes and to double check to see that there are no errors and that the changes reflect what the user intended to change. Once the user is happy, he or she schedules the Project to be executed. This generally commits the changes to be distributed using the present invention.

When the scheduled time is reached, the preferred embodiment begins processing each Change Object one by one. Each Change Object is asked for its database references. With this information, all available Format files, like those listed in 1c are scanned to see if the changed data is also appearing in an outside data file. If it is, the external data file is located with the link file as shown 1e and the Format file is used to surgically update the external data file. Since the complete format is now known, this is a manageable problem.

When the project file is completed and all Change Objects have been executed, all external data files are synchronized to the common database.

In the case of external data being flagged as the source or original copy, the user can at any time automatically collect information from external change files an a roughly reverse action from the one just described. This will load data from outside sources.

3. Case Example Using the Present Invention

Following is a specific example of the preferred embodiment in the case of the administrative offices of a large American city, or simply the City.

This particular city government office conducts the following processes: ROLM CBX management, ROLM PhoneMail management, Telco Research TRU call accounting, Telident STS E9-1-1 management, ROLM attendant directory, external directory publishing, and cable management.

The Present Invention may be applied to several of these areas, however, the Telident STS™ E9-1-1 processor will be used in the following example.

3a. Prior Art of the Case

The City's E9-1-1 processor accepts a computer file containing a list of extension numbers and ANI numbers. For each extension connected to the City's PBX there is a corresponding ANI to tell the central office which ALI record to use. The list of extension numbers and ALI numbers must be maintained. If an extension moves to a different location, the ANI associated with it must be changed or emergency personnel will arrive at the wrong location.

The city makes frequent moves, adds & changes (or MACs) to their PBX. Any change made to the PBX that involves a change in location will require a change to the database in the Telident STS processor. This type of change happens frequently at the City as well as most businesses. The average telephone has some change made to it 1.3 times per year. This means that potentially every phone managed by the City may need to have its E9-1-1 information changed for it every year.

The task of updating the E9-1-1 processor was carried out manually by the City. They relied on work orders being filled out properly and propagated to a person responsible for updating the E9-1-1 processor. This task was so tedious that is was rarely done. Just before the invention was applied to the City's case, several months had passed since the last update of the data. Additionally, there was no way to tell if the data was accurate. A manual reconciliation with the PBX was humanly impossible. City officials had no confidence in the data.

3b. Present Invention Step 1

Since the data being maintained for the E9-1-1 processor was inaccurate, the data needed to be initialized to reflect the data in the PBX. The City used a PBX Management tool called MAC•Ez Plus from Impact Technologies. Impact Technologies has a license with Unimax Systems and MAC•Ez Plus, or ME+, contains the Present Invention. However, the initialization phase only needed ME+'s capability of exporting the list of Extensions in the PBX.

The next step was to add the associated ANI numbers to the list. This was a one time manual process. Since the list of extension numbers was numerically sorted, it was fairly easy. The ANI numbers were placed with each extension number by placing it on the line with a tab character. This generated a Tab Delimited file.

We will call the file "STS.TXr" and place it in the City's network directory managed by ME+.

3c. Present Invention Step 2

The next step of the present invention is to create the Format file. We know the file is a tab delimited file. The first field, the key field, is the extension number. the second field is the ANI number. Both values are separated with a tab character and ended with a carriage return and line feed as is typical in MS DOS based computers.

With this information a Format file was created:

[General]
   Name=Telident STS Fields
   Version=1.0.0
[Format1]
   Name=Extension/ANI Pairs
   Mode=Delimited
   RecordDelim=/013/010
   FieldDelim=/009
   HasHeader=No
   Sorted=Yes
   KeyField=1
   Field1=N"Extension" IEXRN TSTRG FW
   Field2=N"ANI" IANIN TSTRG FRWA We will call the file "STS.FMT" and place it in the City's network directory managed by ME+.

3d. Present Invention Step 3

Both the Format file and the text file of data were placed in the directory managed by ME+. By default, ME+ looks in its own directory. Therefore no file path is necessary in this case. The location information is passed to the following step.

3e. Present Invention Step 4

Next a link file is created. ME+ already uses a link file called "LINK.INI" for other purposes. We utilize this to add our own section. ME+ expects that user defined links will be named LINKN where N is a number between 1 and 100.

```
[SEF]
FormatFile  =  R9000SEF.FMT
DataFile1   =  COS_NAME.TXT
DataFile2   =  FPLTNAME.TXT
DataFile3   =  COMMNAME.TXT
DataFile4   =  DISTNAME.TXT
DataFile5   =  HUNTNAME.TXT
DataFile6   =  PICKNAME.TXT
DataFile7   =  SYSPNAME.TXT
[UDF]
FormatFile  =  UDF.FMT
DataFile1   =  RXTN_UDF.TXT
DataFile2   =  PADS_UDF.TXT
DataFile3   =  PADS_UDF.TXT
[LINK1]
FormatFile  =  STS.FMT
DataFile1   =  STS.TXT
```

The Link file associates the Format file with the text field used to maintain the data. The link file is already in the City's network directory managed by ME+.

3f. Present Invention Step 5

The above steps could be repeated for other processes that need to know about the ANI information. By using the same ANI field identifier, the ANI information could be updated in another text file. In this case the procedure is not repeated.

3g. Present Invention Updating

Now that all of the data is in place, the present invention is able to make a single point update. When the City needs to move a phone, they use the PBX management system, ME+, which uses the present invention, to do it. Here they enter the extensions of a new location and thereby specify a new ANI. The City then schedules the change to occur immediately. ME+ transmits the location change information to the PBX and then sends the ANI change information to the STS.TXT file. It does this by reading the LINK.INI file to locate the STS.TXT file and the STS.FMT file. It opens the STS.FMT file and sees that the field descriptor mentioned in the file is for the ANI number which is involved with the change. It also sees that the key field is the extension number. It then opens the STS.TXT file and scans for the extension number involved in the change. Once the proper record is found, it changes the value of the ANI field to what the change indicates. This is done for any other changes involved with the STS.TXT file. Had any other external data files include the ANI information, they would be included as well.

3h. Detailed Description of Update Process.

The process of automatic external data synchronization in this case example using the preferred embodiment as follows.

Computer reads link file To start the process of updating the External data files, the computer program must know what Format files the current program is using. It also needs to know what External data files are associated with each Format File. Both of these pieces of information are found in the Link File.

Computer opens Format Files At this point the program does not know if any External data files need to be updated. The program must open all the Format Files first because these files specify the field names (identifiers) that the External data files contain.

Computer determines which External data files to update If the Format Files specify an fields that our Change Object is changing, then all of the External data files that contain affected fields are targeted for updating. The computer now knows whether or not any External data files need updating.

Computer finds affected fields The Change Object represents changes to a single record in the commn database. The External data file represents some set of the fields in the common database. The set can be the same records, a subset or a superset. Usually the External data file is a small intersection of fields of the common database and the external process using the External data file data.

Computer finds specific records to update Using the key field found in the Change Object, the computer searches the External data file for the matching record. The key field is unique. The Format files tells the computer how to interpret the External data file as records and fields. It also tells the computer which field is the key field to be used in the search.

Record is changed Once the record is found, the individual fields that were changed in the Change Object are updated in the External data file record. If the fields are of variable length, the file may need to be rewritten to accommodate the field being larger or smaller. This is also the case when the Change Object is indicating that the record needs to be created or deleted in the External data file. The Format File contains all the necessary information to determine how to rewrite the file.

This operation is symbolically indicated in FIG. 6. Starting from the common database 70, when a change is needed, a record is selected as indicated at step 120. This record is then copied at step 121 and displayed on the screen as suggested at step 122, so the user can edit the record copy in order to enter the change. At step 125, the copy is compared with the original from the database, and the change is then applied to the common database at 126 to update it.

At the same time the change becomes a change object at step 130. When there are a number of changed objects that may be added into a project as indicated at step 140. The project is then scheduled as indicated at step 144. At the appropriate time the project is executed as indicated at step 150.

In execution, each change is processed one at a time. The change is queried to find all fields affected, as indicated at step 155. The computer determines which data file contain the affected fields. Using a format file indicated by reference number 160, the computer examiners the keyfield of each record in each data file for a match with one of the change objects. As indicated at step 170, for each record found the individual fieldvalues are changed, using information from the format file. This may involve rewriting the file in the case of added or deleted records. As indicated by flow arrow 175, the computer repeats the process for all data files for the affected change. This is all then repeated for each additional change in the project, if any.

As is apparent from the above description of the preferred embodiment, the present invention provides a solution to the problem of manual updating systems by using automatic means to update the external databases. Human errors are eliminated.

The solution avoids the problem of batch export/import methods because redundant data is constantly kept in sync. The opportunity to make decisions based on stale data is eliminated.

The solution further avoids the problem of specific standardized facilities which would require a complete overhaul of existing management environments. The purchase of the new systems also requires extensive analysis of the systems to ensure the proper compatibility. Most corporations do not have this skill available internally. Furthermore, many areas of management do not have software systems available with a new specific standardized facility.

The present invention is proposed as a generalized standard facility. Software developers choosing it over specific standardized facilities will be able to allow their systems to communicate with existing software and legacy databases.

We claim:

1. A method of synchronizing redundant data in a plurality of dissimilar external electronic database files, comprising the steps of:
    (a) for each such external data file, determining the data field and record structure of the database, and creating a format file describing said structure;
    (b) determining the addressable location for each such external data file;
    (c) for each such external data file, creating a data link file which associates its format file with the text field in a database used to hold the data;
    (d) in response to desired modification of any of the data which is held in more than one of said external data files, for each described modification, applying a change to the data in the affected data files; including;
    (e) comparing said change to said format files as associated with each of the said external files to determine which external data files need to be updated;
    (f) using link files, format information, and address location to update the data fields in the affected external data files to correspond with the change; and
    (g) repeating steps e and f until all affected external data files have been updated to reflect the changed data.

2. A method of synchronizing redundant data in a plurality of dissimilar external electronic database files, comprising the steps of:
    (a) for each such external data file, determining the data field and record structure of the database, and creating a format file describing said structure;
    (b) determining the addressable location of each external data files;
    (c) for each such external data file, creating a data link file associating its format file with the text field in a database used to hold the data;
    (d) creating a common database of data field items which are found in common in a plurality of said external data files;
    (e) in response to desired changes in any of the data which is held in more than one of said external data files, changing the data in the common database;
    (f) for each such change of data in the common database, comparing said change to said format files to determine which external data files need to be updated;
    (g) using link files, format information, and address location to update the data fields in the affected external data files to correspond with the change made to the common database; and
    (h) repeating steps f and g until all affected external data files have been updated to reflect the changed data.

3. The method of claim 2 wherein the step of creating a format file for each external data file includes identifying the fields, and the field and record delimiters.

4. The method of claim 2 wherein said step of changing the data in the common database includes entering replacement data, comparing it with the previous data, and generating a change object to apply to update the external databases.

5. The method of claim 2 wherein said step of changing the data in the common database includes collecting a number of changes, then scheduling a batch update to the external databases.

6. A system for automatically updating data fields which are used in a plurality of different external target database files which may have differing data structures, comprising:
    a computer for performing the data updates, said computer having storage and processing resources, and data communication means operatively connected for selective access to the external target files;
    a common database holding data elements which are used in the external target files;
    first programmed data means for specifying the data format structure and field identification for each of the external target files;
    second programmed data means for linking said data formats with the text fields in external target files used to hold the data;
    said computer system including means for entering changes in data elements of said common database to reflect changes in the underlying information represented by the data; and
    said computer system including programmed means operative in response to changes in data elements in said common database to use said link and format data to rewrite the affected data fields in the external target files to synchronize them with the common database.

* * * * *